Sept. 19, 1967   L. R. DAVIDSON ET AL   3,341,979

MACHINE FOR MECHANICALLY FINISHING WORKPIECES

Filed Jan. 19, 1965   6 Sheets-Sheet 1

INVENTORS
LEO R. DAVIDSON
RICHARD L. DAVIDSON
BY

ATTORNEYS

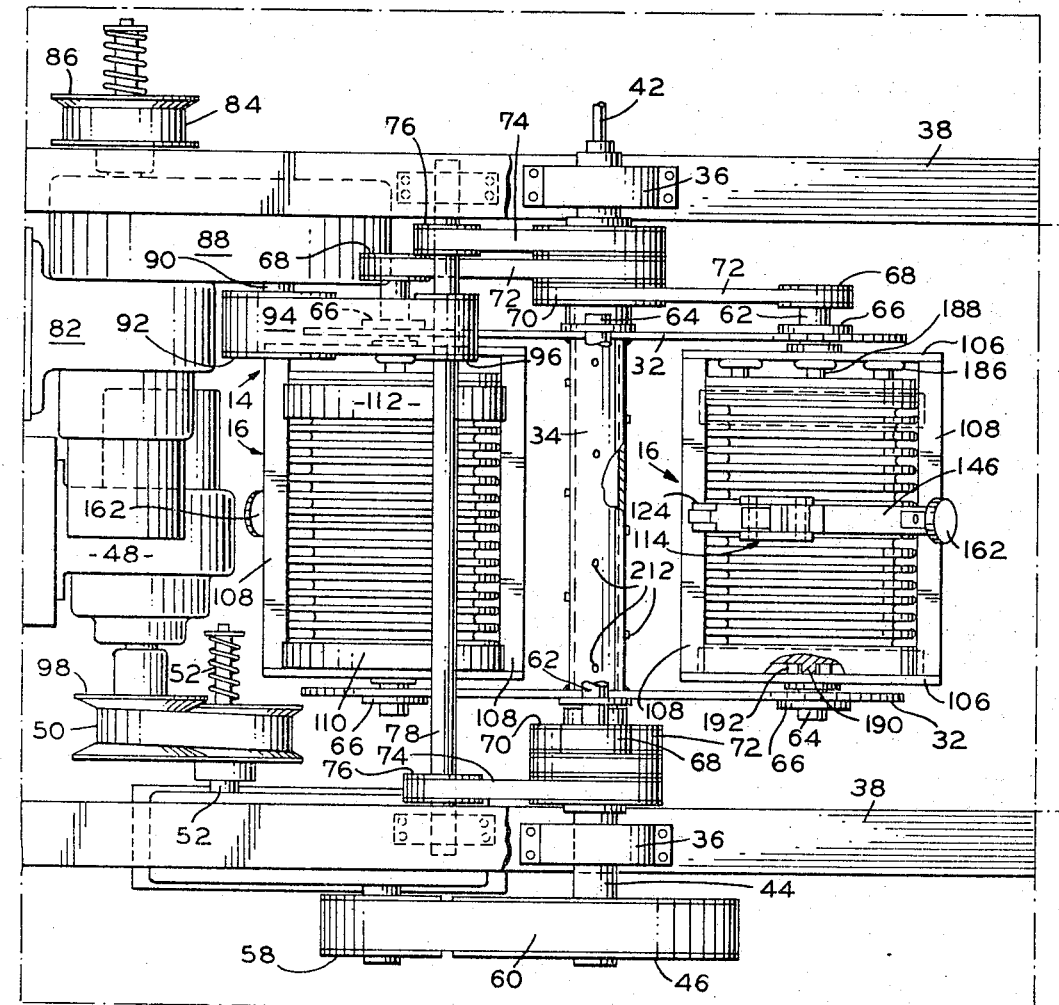

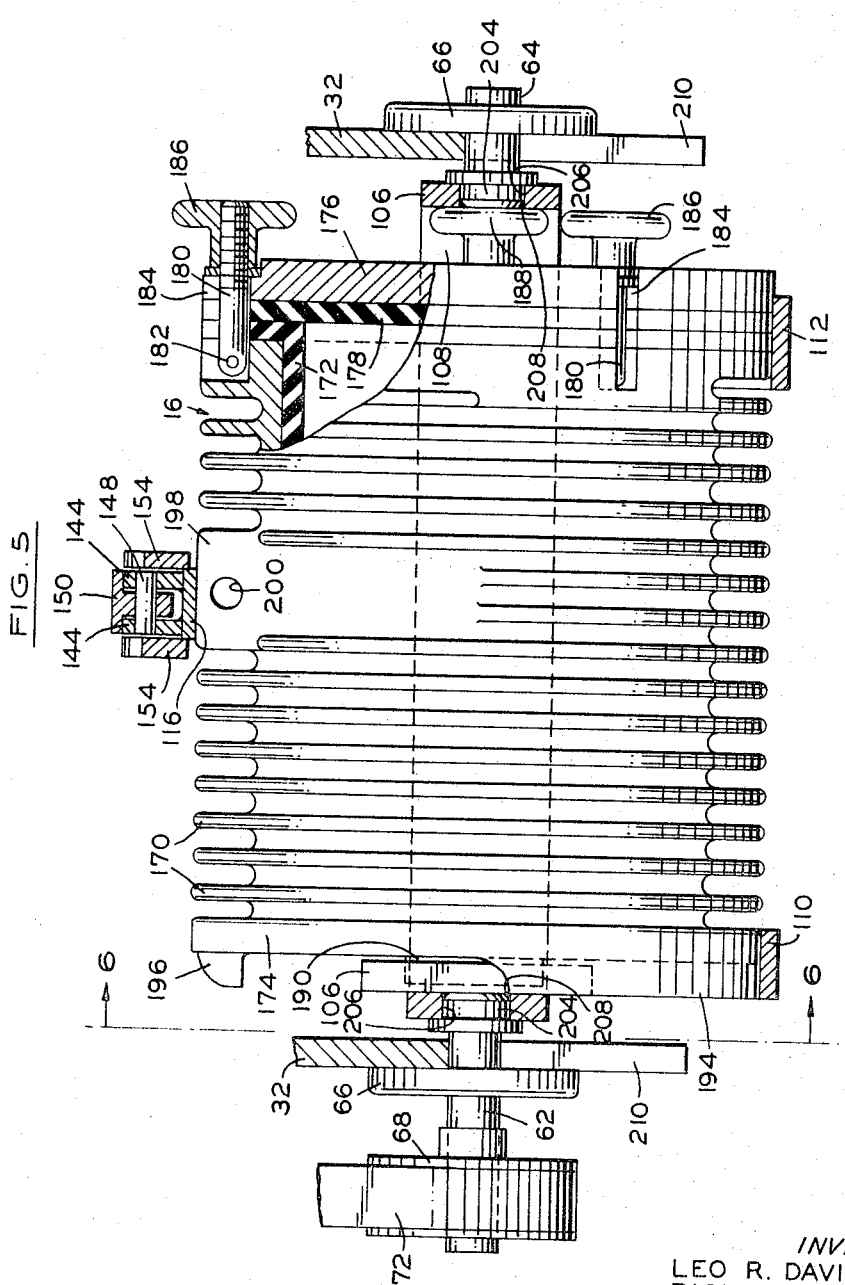

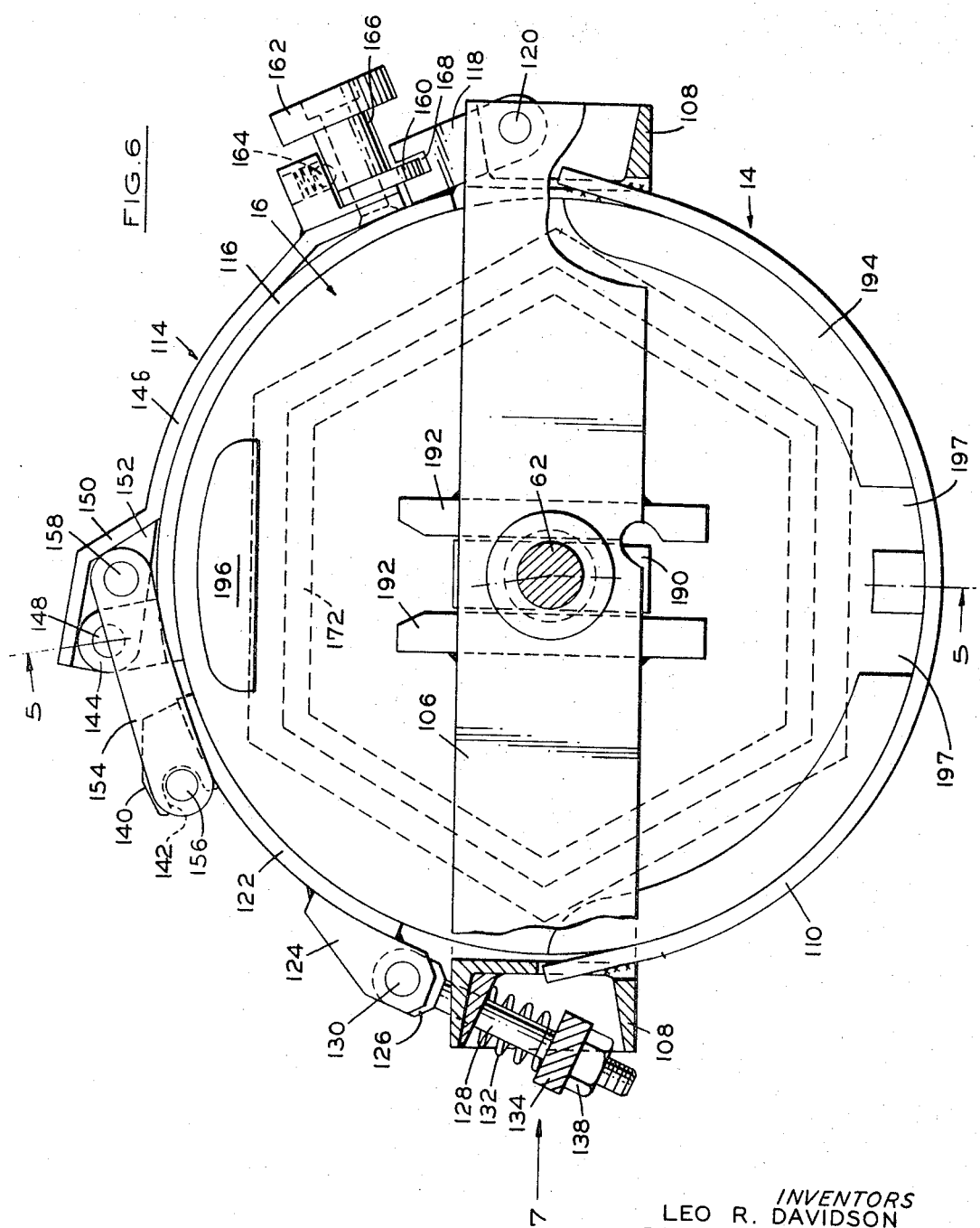

United States Patent Office 3,341,979
Patented Sept. 19, 1967

3,341,979
MACHINE FOR MECHANICALLY FINISHING WORKPIECES
Leo R. Davidson and Richard L. Davidson, both of 400 Norwood Ave., Sturgis, Mich. 49091
Filed Jan. 19, 1965, Ser. No. 426,644
3 Claims. (Cl. 51—164)

ABSTRACT OF THE DISCLOSURE

This invention generally has to do with a deburring or polishing machine having a rotatable turret around the periphery of which are journalled tumbling cylinders. Means are provided for rotating the turret and the tumbling cylinders independently of one another and at variable speeds. The tumbling cylinders are mounted in cages in which they are adapted to be clamped so as to permit removal of the cylinders from the machine and the replacement thereof with other cylinders containing media and parts to be deburred or otherwise finished.

---

This invention relates to machine for mechanically finishing workpieces, particularly small workpieces which must be deburred or have the surface thereof polished or buffed to a very smooth finish preparatory to plating, such as decorative chromium plating.

Many types of small workpieces, such as stampings, die castings, etc., must be deburred, polished and/or buffed in order to remove surface irregularities therefrom or to prepare the surface of the workpiece for plating. Heretofore there have been proposed several different methods and machines for finishing the surfaces of such workpieces. For example, for many years the conventional tumbling barrel has been employed for mechanically finishing small workpieces. More recently machines have been developed for finishing such workpieces in a shorter period of time than is possible with the conventional tumbling barrel. One form of prior art machine for mechanically finishing workpieces in this manner comprises a turret on which a plurality of tumbling cylinders are journalled for rotation about axes spaced from the axis of the turret. The tumbling cylinders are charged with a quantity of workpieces to be finished and also an abrasive media of some type. This prior art machine is constructed so that the speed of rotation of the turret is at least twice the speed of rotation of the cylinders. In other words, in the machine referred to the speed of rotation of the cylinders in relation to the speed of rotation of the turret is in a ratio of about one-half to one. This prior art machine forms the subject matter of U.S. Patent No. 3,013,365.

We have discovered, contrary to the teachings of the prior art, that with machines of the type described, that is, turret type machines wherein the tumbling cylinders are rotated about axes spaced from the rotational axis of the turret workpieces can be finished in much less time by rotating the tumbling cylinders at a speed greater than, as distinguished from less than, the speed of rotation of the turret. For example, experiments have shown that with small steel stampings and zinc die cast workpieces an optimum finish can be obtained in a minimum of time by rotating the cylinders about their own axes at a speed of about twice the speed of rotation of the turret.

Thus, the primary object of the present invention is to provide machine for mechanically finishing workpieces in a minimum amount of time.

A further object of the invention resides in the provision of a machine for mechanically finishing workpieces which is designed such that the speed of rotation of the turret and speed of rotation of the tumbling cylinders can be independently controlled to produce the optimum finish in a minimum time period, depending upon the workpieces being worked on, the type of finishing required and the particular abrasive media employed.

A further object of the invention resides in the provision of a machine for mechanically finishing workpieces which is of simple construction and designed to be operated in a very efficient manner.

The machine of the present invention generally comprises a turret on which a plurality of cradles are journalled for rotation about axes spaced from the axis of rotation of the turret. Each cradle is adapted to removably receive a tumbling cylinder which is charged with the workpieces to be finished and an abrasive madia. A drive is provided for rotating the turret at a desired r.p.m., and an independent drive is also provided for rotating the tumbling cylinders at a variable speed faster than the speed of rotation of the turret. With the above-described arrangement, the turret is rotated at a speed such that the centrifugal force causes the mass of workpieces and abrasive media to become firmly compacted against the radially outer sides of the tumbling cylinders. At the same time, since the cylinders are rotated at a speed greater than the speed of rotation of the turret, the mass of abrasive media and workpieces are caused to flow around the inner periphery of the cylinders and in so doing the workpieces travel through the highly compacted mass of abrasive media at a relatively rapid rate, so that the surfaces thereof are mechanically finished by reason of the cutting or abrading action of the abrasive media. It is believed that the superior results obtained by the method of the present invention are attributable primarily to the fact that when the cylinder speed and the turret speed are in a ratio of about two to one, a substantially more rapid cutting action is obtained since the workpieces are moving through the compacted media at a greater rate of speed than they are when the cylinders are rotating at a speed only half the speed of the turret.

While in most instances a ratio of cylinder speed to turret speed of about 2:1 is preferred, this ratio will vary slightly, for example, from 1½:1 to about 3:1, depending upon the type of operation being performed, that is, deburring, buffing, etc., the type of abrasive media employed, the unit weight of the workpieces being operated on and the material from which the workpieces are made. For example, zinc die cast material workpieces are more readily subject to impact damage than steel workpieces, and thus as a general rule the speed ratio referred to above can be higher with steel workpieces than softer workpieces such as those made from zinc die cast metal. This is particularly true in the case where steel workpieces are being deburred and the zinc die cast workpieces are being polished or buffed preparatory to decorative chromium plating. The variables referred to above will also determine to a large extent the actual speed of rotation of the turret. For example, if the finishing operation is one of deburring alone, the turret can be rotated at a higher speed than is advisable when the workpieces are being polished preparatory to plating. Likewise, some of the abrasive materials used for polishing tend to break down much more readily than other abrasive materials, and therefore the speed of rotation of the turret has to be determined with this fact in mind.

Other features and advantages of the invention will become apparent from the following description and drawings, in which:

FIG. 4 is a top plan view of the machine with the outer casing removed.

FIG. 5 is a sectional view of a cradle on the machine and showing the tumbling cylinder employed in the machine in side elevation and with parts broken away, said view being taken substantially along line 5—5 in FIG. 6.

FIG. 6 is an end view, partially in section and with parts broken away, of one of the cradles in the machine with the tumbling cylinder locked therein, said view being taken substantially along line 6—6 in FIG. 5.

Figure 1:
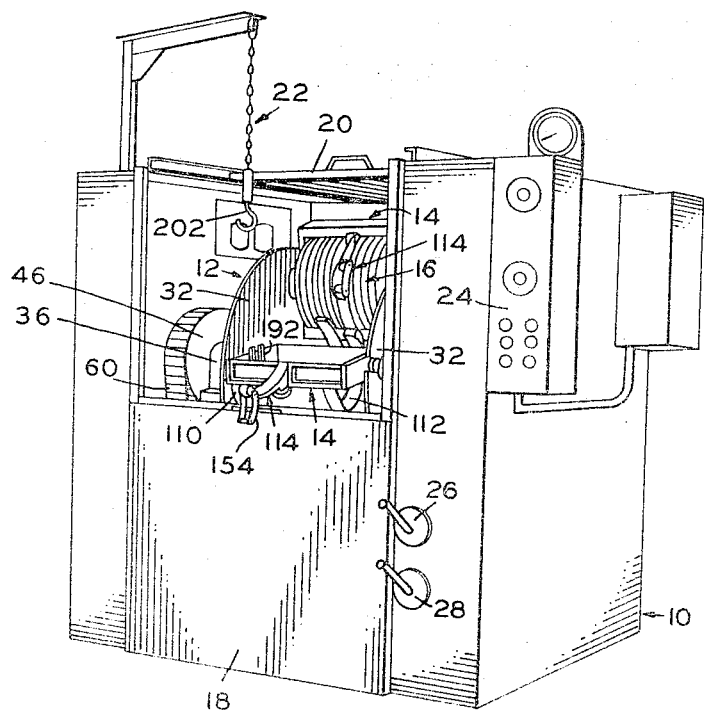
FIG. 1 is a perspective view of a workpiece finishing machine embodying the present invention.

As is illustrated in FIG. 1, the machine includes a sheet metal outer casing 10 which encloses the structural members and the operating mechanism of the machine. Generally speaking, within the casing 10 there is arranged a rotary turret 12 on which are journalled cradles 14 constructed to receive tumbling cylinders 16. At the front side of the machine there is arranged a vertically sliding panel 18, and at the top of the machine there is arranged a horizontally sliding panel 20. These panels are shown in FIG. 1 in the open position to permit access to the turret 12 and thereby enable loading and removal of the tumbling cylinders 16 from the cradles 14. A hoist 22 is mounted at one side of the machine to assist loading and removal of the tumbling cylinders 16 from cradles 14. At the front side of the machine there is arranged a control panel 24 and also a pair of cranks 26, 28 for controlling the speed of rotation of turret 12 and cradles 14 as hereinafter more fully described.

Figure 2:
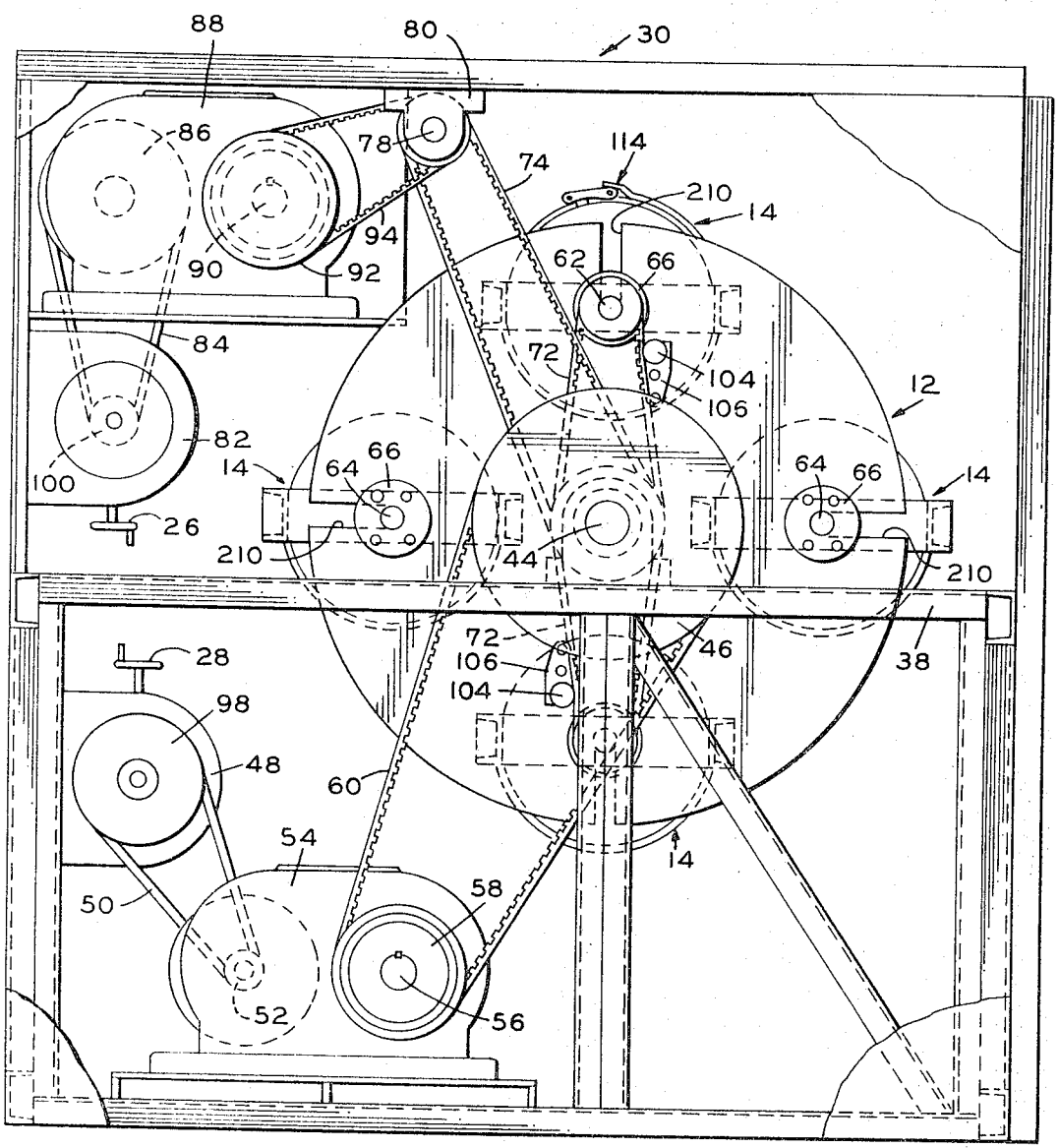
FIG. 2 is a side elevation of the machine with the shell or outer casing removed.
Figure 3:
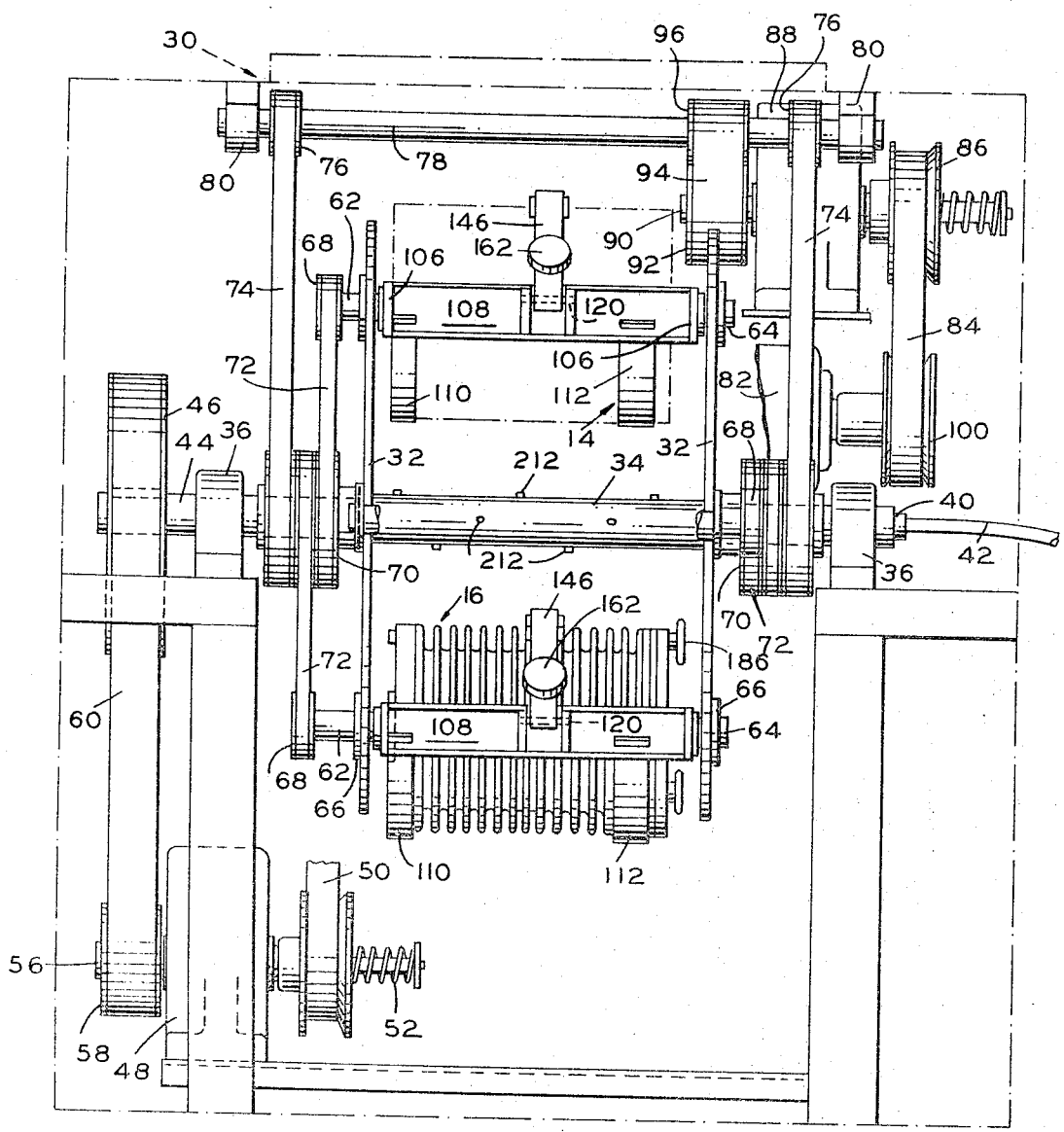
FIG. 3 is an end view of the machine with the outer casing removed.

Referring to FIGS. 2 through 4, it will be observed that within the outer casing 10 there is arranged a frame 30 formed of structural steel members and on which various components of the machine are mounted. For example, turret 12 comprises a pair of spaced apart side plates 32 which are mounted, as by welding, on a hollow shaft 34 journalled adjacent its opposite ends in pillow blocks 36 mounted on horizontal frame members 38. At one end of hollow shaft 34 there is preferably provided a coupling 40 for enabling the shaft to be connected with a source of coolant through a conduit 42. At its opposite end, beyond the pillow block 36, the extension 44 of shaft 34 has keyed thereto a drive pulley 46. The means for rotating drive pulley 46 comprises an electric motor 48 having a belt drive 50 with the input shaft 52 of a speed reducer 54. The output shaft 56 of speed reducer 54 has a pulley 58 keyed thereto, and a belt 60 extends around pulley 46 and pulley 58 to establish a drive from motor 48 to turret 12.

As is best shown in FIG. 2, four cradles 14 are arranged around the center hollow shaft between the two side plates 32 of the turret. Each cradle has stub shafts 62, 64 at its opposite ends which are journaled in bearings 66 bolted to the outer side of the side plates 32. Stub shafts 62 are longer than the stub shafts 64, and the four cradles are arranged on the turret so that on two diametrically opposed cradles 14 the stub shafts 62 project axially through and beyond one of the side plates and on the other two cradles 14 the stub shafts 62 project axially through and beyond the other side plate 32. Each of the stub shafts 62 has a pulley 68 fixed on the free end thereof. The main shaft 34 has two pulleys 70 arranged thereon for free rotation, one positioned between each side plate 32 and the adjacent pillow block 36. Pulleys 70 have three belt grooves therein. In two of the belt grooves are arranged timing belts 72 which extend around the two pulleys 68 on the corresponding side of the turret, and the third belt groove on each pulley 70 has a belt 74 therein which extends around a pulley 76 keyed to a countershaft 78 mounted on the frame of the machine by means of a pair of pillow blocks 80. Countershaft 78 is in turn driven from an electric motor 82 which has a belt drive 84 with a pulley 86 on the input shaft of a speed reducer 88. The output shaft 90 of speed reducer 88 has a pulley 92 keyed thereto which has a belt drive as at 94 with a drive pulley 96 keyed to shaft 78. Pulleys 98, 100 on the drive shafts of motors 48, 82, respectively, are of the variable speed type and are adjusted by means of the cranks 26, 28. In FIG. 1, the cranks 26, 28 are shown at the front of the machine, whereas for purposes of simplification these cranks are shown mounted directly on their respective motors in FIG. 2. In practice, a universal type linkage would be employed for connecting the cranks 26, 28 at the front of the machine with their respective electric motors.

With the drive arrangement thus far described, it will be appreciated that when motor 48 is energized, turret 12 is rotated about the axis of shaft 34, and when motor 82 is energized cradles 14 are rotated about the axis of stub shafts 62, 64 on the turret. Thus the speed of rotation of the turret 12 can be controlled independently of the speed of rotation of the cradles since pulleys 70 are journalled for free rotation on shaft 34.

Since, as pointed out previously, the ratio of the speed of rotation of the turret to the speed of rotation of the cradles is important, it is desirable and preferred that the belts 72 and 74 be in the nature of timing belts and that the pulleys around which the belts extend are timing pulleys. The use of timing belts and pulleys rather than chains and sprockets makes for quiet operation without introducing slippage in the drive. Furthermore, for the purpose of taking up any slack in the timing belts 72, each timing belt 72 has associated therewith a roller 104 (FIG. 2) journalled on a bracket 106 pivotally supported on the side plates 32 of the turret. Each bracket 106 is adapted to be pivoted to a position wherein each roller 104 takes the slack out of belts 72 and then is fixedly clamped in this position.

Referring now to FIGS. 3 and 6, each cradle 14 comprises a generally rectangular frame consisting of a pair of spaced end plates 106 which are interconnected at each end by a pair of spaced channels 108. The stub shafts 62, 64 by means of which the cradles are journalled on the turret are welded to the end plates 106. The two channels 108 are interconnected by a pair of semi-circular straps 110 and 112. As is shown in FIG. 3, strap 110 is secured to channels 108 adjacent one end thereof, while strap 112 is secured to the channels 108 at a point spaced inwardly from the end thereof. Straps 110, 112 in combination with channels 108 and end plates 106 define a receptacle which is generally semi-cylindrical in shape and in which the tumbling cylinders 16 are adapted to be inserted.

The tumbling cylinders are arranged to be locked in the cradles by means of a latch mechanism generally designated 114 in FIG. 6.

Figure 7:
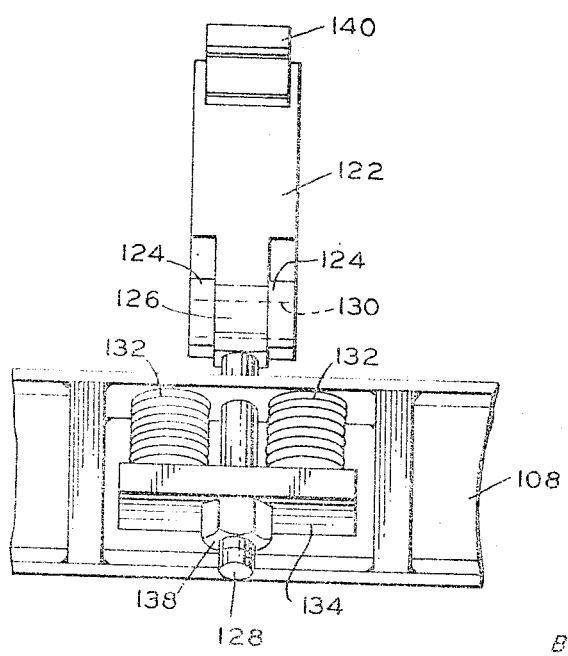
FIG. 7 is a fragmentary view of one of the cradles, taken in the direction of the arrow 7 in FIG. 6.

Each latch mechanism 114 includes an arcuate strap 116 welded at one end to a lug 118 pivotally supported on one of channels 108 as by a pin 120. A second arcuate strap 122 is welded to a bifurcated lug 124 pivotally connected to the head 126 of a stud 128 by a pin 130. Stud 128 extends through the upper flange of the other channel 108 and is biased in a downward direction by a pair of springs 132 which bear against the upper flange of channel 108 at their upper ends and against a cross-head 134 at their lower ends. Stud 128 extends through cross-head 134, as is shown in FIG. 7, and the tension on springs 132 is adjustable by means of a nut 138 arranged on the lower threaded end of stud 128.

Adjacent the free end of strap 122 there is welded a hook member 140, the recess 142 of the hook member opening in a direction toward the bracket 124. Adjacent the free end of strap 116 there is welded a bifurcated bracket 144 on which another arcuate strap 146 is pivotally supported as by a pin 148. Strap 146 adjacent pin 144 has an offset portion 150 on the underside of which there is welded a gusset 152 which seats in the bifurcation of bracket 144 (FIG. 5). Pin 148 actually extends through gusset plate 152, and the latter serves as one link of a toggle mechanism. The other link of the toggle mechanism comprises a pair of spaced apart links 154 which are interconnected by a pin 156 at one end and by an additional pin 158 at their opposite ends. Pin 158 also extends through gusset plate 152 and forms a pivotal connection between links 154 and gusset plate 152. Strap 146, as is illustrated in FIG. 6, overlies strap 116 and adjacent lug 118 on strap 116, strap 146 has mounted thereon a rotary latch member 160 adapted to be actuated by a knob 162. A spring-pressed ball detent 164 is arranged to bear against the shank 166 of the latch to hold it in the position to which it is rotated. Lug 118 is fashioned with a slot 168 into which the latch member 160 may be rotated.

It will be observed that with the parts in the positions illustrated in FIG. 6, wherein the latch member 160 is engaged within the slot 168 in lug 118, strap 146 is locked in its position overlying strap 116, since the interengagement of latch member 160 with groove 168 prevents strap 146 from being pivoted about pin 148 in a counterclockwise direction. In this position of strap 146, it will be observed that the pivotal connection formed by pin 148 is offset to one side of the center line extending between the axes of pins 156 and 158. Thus with the pin 156 engaged with the hook 140 as illustrated and with the springs 132 applying tension to the links 154, the toggle is effectively locked and latch member 160 merely serves as a safety device to prevent accidental unlocking of the toggle.

When it is desired to remove the tumbling cylinder 16 from its cradle 14, knob 162 is rotated to disengage latch member 160 from the slot 168. Strap 146 can be pivoted in a counterclockwise direction about pin 148 as an axis, and in so doing links 154 are pivoted upward from the position shown in FIG. 6 to the other side of pin 148 to unlock the toggle and thereby permit disengagement of pin 156 from hook member 140. Thereafter strap 122 can be rotated in a counterclockwise direction about pin 130, and strap 116 together with strap 146 can be rotated in a clockwise direction about pin 120 to open up the cradle 14 and permit removal of the cylinder 16 therefrom.

Referring now to FIGS. 5 and 6, it will be observed that each cylinder 16 has a circular outer periphery defined by a plurality of circumferentially extending fins 170. The inner peripheral surface of each cylinder is hexagonally shaped in cross section (FIG. 6). A liner 172 of a soft material such as synthetic rubber or polyurethane covers the inside of each cylinder. Each cylinder 16 is closed at one axial end thereof by a bottom wall 174. At its opposite or upper end each cylinder 16 accommodates a cover 176 having a rubber liner 178 on the underside thereof. A plurality of studs 180 are pivotally supported at circumferentially spaced points around the upper end of each cylinder, as at 182. Studs 180 extend through radial slots 184 around the periphery of cover 176. Threaded knobs 186 on the ends of the studs 180 are provided for tightening the cover 176 over the open end of cylinder 16. A centrally located knob 188 serves as a handle for the cover.

While the latch mechanism on each cradle could be designed so that when the toggle mechanism is in the locked position each cylinder 16 would be tightly gripped in its respective cradle, it is preferred to provide a positive rotary drive connection between each cradle and its cylinder 16. Accordingly, the bottom wall 174 of each cylinder is fashioned with a drive lug 190 in the form of a centrally located non-circular projection. On the adjacent end plate 106 of each cradle, a pair of spaced apart guide bars 192 are welded, the guide bars being adapted to receive therebetween the drive lug 190 on the cylinder. The lower end of each cylinder 16 is fashioned with an axially extending peripheral flange 194 which is cut away as illustrated to form a handle portion 196 at one side of the cylinder. Opposite handle portion 196 flange 194 is notched as at 197 to provide clearance for bars 192 when the cylinder is inserted in a cradle. Centrally between the ends of the cylinder a solid lug 198 is formed on the finned periphery of the cylinder and provided with an aperture 200 therein through which the hook 202 of hoist 22 (FIG. 1) may be inserted to facilitate loading and removal of the cylinders from within cradles 14.

It will be observed that the two end plates 106 of each cradle 14 are spaced apart by the channels 108 such that when a cylinder 16 with its cover 176 securely mounted thereon is inserted into the cradle, the cylinder assembly has a rather close fit with the two end plates 106, so as to prevent any substantial endwise movement of the cylinder with respect to its cradle. It will also be observed from FIG. 5 that the stub shafts 62, 64 are fashioned with flanged enlargements 204 at their inner ends which extend into sockets 206 in end plates 106 and which are welded therein as at 208, so that the stub shafts 62, 64 are fixedly and solidly connected to the cradles. Likewise it will be noted that at the location of the bearings 66, each side plate 32 is formed with a slot 210 which extends radially to the outer periphery of the side plate. This facilitates assembly of cradles 14 with side plates 32. Each cradle can be completely assembled with the stub shafts 62, 64, then slipped into position on the turret and locked in place by bolting bearings 66 to the side plates.

In operation the tumbling cylinders 16 are charged with a mixture of an abrasive media and the workpieces to be finished at a loading station. The loading station may comprise a platform or table, not illustrated, on which the cylinders are positioned in an upright position. After the cylinders are suitably charged, cover 176 is placed over the open end thereof and secured in place by pivoting studs 180 upwardly through slots 184 in cover 176 and then tightening the knobs 156. Then by means of hoist 22 the loaded cylinder can be picked up and swung into a position overlying empty cradle 14 on the turret 12. One such empty cradle 14 is illustrated in FIG. 1 with the latch mechanism 114 unloaded and the pivoted straps 116, 122 swung to open position. The cylinder 16 is then lowered into cradle 14 so that the drive lug 190 engages between guide bars 192. After the cylinder is lowered to its fully seated position where it is supported by the arcuate straps 110, 112, extending around the lower side of the cradle, straps 116 and 122 are swung upwardly and inwardly to overlie the upper exposed peripheral surface of the cylinder and the latch mechanism 114 is actuated to firmly clamp the cylinder in position within the cradle.

The desired speed of rotation of the turret is then selected by adjusting knob 28, and likewise the desired speed of rotation of the cylinders is selected by adjusting knob 26. As indicated previously, the speed of rotation of the turret and the ratio between the cylinder speed and the turret speed are selected according to the type of workpieces being finished, the type of finishing operation being performed, the unit weight of the workpiece and the particular abrasive media being employed. The ratio of the cylinder speed to the turret speed will always be in the range of about 1½:1 to 3:1 since this range of ratios produces the maximum of stock removal. In most instances a ratio of about 2:1 between the cylinders and the turret is selected and the speed of rotation of the turret is varied as determined by the variables referred to above.

In any event, the turret speed has a sufficiently high value so that centrifugal force acting on the cylinder will cause the mass of abrasive media and workpieces therein to be tightly compacted against the wall of the cylinder in a direction radially outwardly of the turret. The cylinders are at all events rotated at a greater r.p.m. than that of the turret, so that while the mass of abrasive media and workpieces are tightly compacted they tend to flow around the inner periphery of the cylinders at a relatively rapid rate. The workpieces are thus caused to flow or move through the compacted media at a relatively fast rate, and the abrading or cutting action of the abrasive removes metal from the outer surfaces of the workpieces. Generally speaking, for a deburring operation, the turret speed can be substantially faster than in a buffing or polishing operation. For example, in a deburring operation the turret speed can be adjusted to about 120 r.p.m., whereas if the same workpieces were to be buffed or polished, the turret speed would be reduced in most instances down to about 90 r.p.m. A slower r.p.m. of the turret produces less impact between the workpieces being processed, it being understood, of course, that in an operation of this type some degree of impact is inevitable.

For the purpose of determining comparative rates of stock removal in relation to different ratios of cylinder speed to turret speed, numerous runs were made using both steel parts and zinc die cast parts. In the case of steel parts the abrasive media was silica granules which varied in size from $3/16''$ to $5/16''$. For finishing non-ferrous workpieces, the media employed was black marble chips which varied in size from $3/16''$ to $5/16''$. In each instance the media included a small quantity of detergent. In each instance the charge of media into the cylinder was 20 lbs. In the case of the die cast workpieces, twenty such workpieces weighing a total of about 1½ lbs. were mixed with the marble chips, and in the case of the steel workpieces thirty such workpieces weighing approximately 4 lbs. 5 oz. were mixed with the silica granules. Each batch was processed for a period of 30 minutes, and independent batches were run at speeds of 90 r.p.m. and 120 r.p.m., and at different ratios varying from ½:1 to 3:1. All runs were made in the same machine having a turret radius to the cylinder axes of 13″, the cylinders having an internal dimension across the hexagonal flats of 8¾″.

In the case of the steel workpieces, with a turret speed of 120 r.p.m. the stock removal on the batch of workpieces at a ratio of ½:1 amounted to 0.130 oz., 0.645 oz. at a ratio of 2:1 and 0.582 oz. at a ratio of 3:1. When the turret speed was reduced to 90 r.p.m., stock removal amounted to 0.071 oz. at a ratio of ½:1, 0.254 oz. at a ratio of 2:1 and 0.346 oz. at a ratio of 3:1. In the case of non-ferrous workpieces, with a turret speed of 120 r.p.m., stock removal on the batch of workpieces amounted to 0.088 oz. at a ratio of ½:1, 0.176 oz. at a ratio of 2:1 and 0.071 oz. at a ratio of 3:1. When the speed of the turret was reduced to 90 r.p.m., the loss of weight amounted to 0.044 oz. at a ratio of ½:1, 0.107 oz. at a ratio of 2:1 and 0.053 oz. at a ratio of 3:1. The relatively slower rate of stock removal in the case of the non-ferrous workpieces at a turrent sped of 120 r.p.m. and a ratio of 3:1, as compared with a ratio of 2:1, was due to the fact that at a ratio of 3:1 and a high turret speed there was a tendency for the black marble chips to break down and form a slushy mass which markedly reduces its abrading or cutting action.

In all of the tests run, the temperature of the media never exceeded about 130° F. However, with certain abrasive media, particularly the drier compounds, there is a tendency for the abrasive media to become overheated at the higher turret speeds and the higher ratios. Accordingly, it is desirable to provide fins on the turret, not illustrated, for promoting an air flow around the cylinders 16. Likewise in the embodiment illustrated, the hollow shaft 34 has nozzles 212 staggered therearound, as illustrated in FIGS. 3 and 4, for spraying the cylinders with coolant directed to the hollow shaft 34 through the conduit 42.

Thus it will be seen that the present invention provides a method and a machine for mechanically finishing workpieces in a relatively short period of time, as compared with similar machines and methods proposed heretofore. The machine is of economical construction and quiet in operation. Furthermore, the production capacity of the machine is substantially increased by not only rotating the cylinders at a speed of about 1½:1 to three times the speed of the turret, which reduces the time required for a cycle, but also by designing the cradles 14 on the machine so that the tumbling cylinders can be readily inserted therein and removed therefrom. Thus, while one set of tumbling cylinders is being charged with or emptied of workpieces and abrasive at a loading station, a different set of cylinders can be in operation on the machine so that a minimum of down time between successive cycles is also achieved.

We claim:

1. A machine for mechanically finishing workpieces comprising a turret mounted for rotation about a generally horizontal axis, said turret having a pair of axially spaced side members, a plurality of cradles extending axially across the space between said side members, each of said cradles being journalled at its opposite ends for rotation on the side members about a horizontal axis which is spaced radially from the axis of rotation of the turret, and means for rotating said cradles and said turret independently of one another, each of said cradles comprising a generally semi-cylindrical receptacle portion for receiving a generally cylindrical drum, a pair of arcuately shaped straps pivotally connected at one end, one to one edge of the receptacle portion and the other to the opposite edge of the receptacle portion, said straps being circumferentially aligned, a toggle mechanism supported on one of said straps and a hook means fixed on the other strap and engageable by said toggle mechanism to secure said straps in latched position encircling the portion of a drum in said cradle which is not encircled by said receptacle portion.

2. The combination called for in claim 1 wherein said toggle mechanism includes a pair of pivotally connected links pivotally mounted at one end thereof on said one strap and engageable at the other end thereof with said hook means, the link mounted on said one strap including an arcuate strap portion which in the locked position of the toggle overlies said one strap and means for locking said strap in said overlying position.

3. The combination called for in claim 2 wherein the pivotal connection between said other strap and said receptacle includes spring means forming a circumferentially yieldable connection between said other strap and said receptacle for applying a circumferential tension to said hook means in the toggle locking direction.

References Cited

UNITED STATES PATENTS

| | | | |
|---|---|---|---|
| 578,969 | 3/1897 | Coates | 51—7 X |
| 1,491,601 | 4/1924 | Fuller | 51—164 |
| 2,020,091 | 11/1935 | Abbe | 51—164 X |
| 2,027,146 | 1/1936 | Bly | 51—164 X |
| 2,116,753 | 5/1938 | Dinetz | 51—164 X |
| 2,403,348 | 7/1946 | Dinetz | 51—164 X |
| 2,881,571 | 4/1959 | Granata | 51—164 |
| 3,078,623 | 2/1963 | Stanley | 51—164 |
| 3,094,818 | 6/1963 | Price | 51—164 |
| 3,177,626 | 4/1965 | Norman | 51—164 |
| 3,233,372 | 2/1966 | Kobayashi. | |

HAROLD D. WHITEHEAD, *Primary Examiner.*